No. 624,519. Patented May 9, 1899.
C. H. METZ.
DIFFERENTIAL GEAR.
(Application filed Jan. 6, 1899.)

(No Model.)

WITNESSES—
Wm. H. Varnum.
A. W. Hamblen

INVENTOR—
Charles H. Metz
by his atty.,
Henry J. Miller

UNITED STATES PATENT OFFICE.

CHARLES H. METZ, OF WALTHAM, MASSACHUSETTS.

DIFFERENTIAL GEAR.

SPECIFICATION forming part of Letters Patent No. 624,519, dated May 9, 1899.

Application filed January 6, 1899. Serial No. 701,319. (No model.)

*To all whom it may concern:*

Be it known that I, CHARLES H. METZ, of Waltham, in the county of Middlesex and State of Massachusetts, have invented certain new and useful Improvements in Differential Gear; and I hereby declare that the following is a full, clear, and exact description of the same, reference being had to the accompanying drawings, forming part of this specification.

This invention has reference to improvements in gear for driving two independently-journaled shafts.

The object of the invention is to improve the construction of differential gear with reference to the same as an equalizing driving connection between two shafts independently journaled in axial alinement.

The invention consists in the independent shafts and bearings in which they are journaled, the spreader between the shafts, the internal gear fixed on one shaft, the spur-gear fixed on the other shafts, the drive-gear rotatable between the internal gear and the spur-gear, and the connecting-pinions mounted on shafts which are journaled in the drive-gear.

The invention still further consists in such other novel features of construction and combinations of parts as shall hereinafter be more fully described, and pointed out in the claim.

Figure 1:
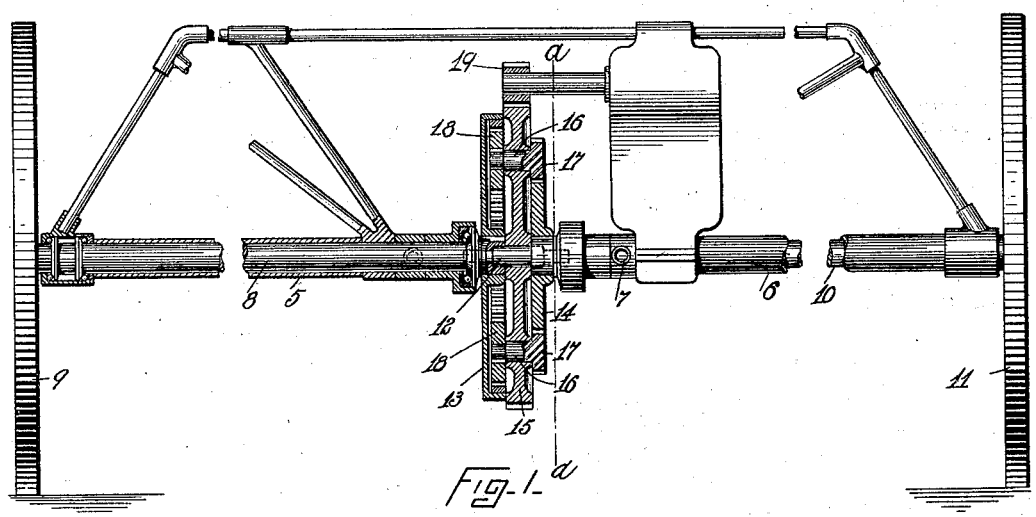
Figure 2:
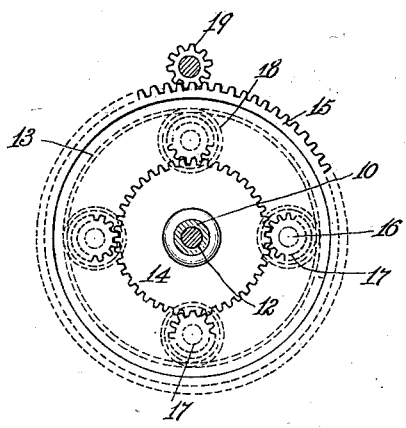
Figure 3:
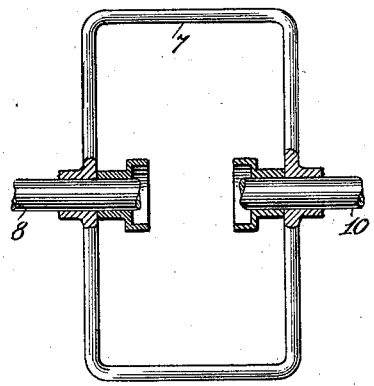

Figure 1 represents a vertical sectional view of the differential gear in connection with the driving mechanism of a motor-vehicle. Fig. 2 represents a vertical sectional view of the differential gear, taken on the line *a a*, Fig. 1. Fig. 3 represents a plan view of the central portion of the shaft-frame.

Similar numbers of reference designate corresponding parts throughout.

In the drawings I have shown the improved differential gear as forming the driving connection between the motor drive-shaft and the shafts or axles of the driving-wheels. It is, however, evident that this gear may apply to any two shafts journaled in axial alinement.

In the drawings, 5 represents a tubular bearing of any well-known construction, and 6 is a similar bearing mounted in line with the bearing 5, but separated therefrom to admit the differential gear between them. In the present construction the inner ends of the bearings are connected by the frame 7. (Shown in plan view in Fig. 3.)

Journaled in the bearings 5 is the shaft 8, having any usual number of antifriction-bearings to coöperate with any such members as are carried by the bearing, and on the outer end of the shaft is a wheel 9, representing the mechanism which is to be operated by this shaft. In the bearing 6 is journaled a similar shaft 10, having at its outer end the wheel 10, these shafts being held from longitudinal movement in their bearings partially by the antifriction-bearings and partially by the spreader 12, the reduced ends of which are rotatable in axially-disposed sockets formed in the inner ends of the shafts, so that the shafts may be independently rotatable.

On the inner end of the shaft 5 is secured the internal gear 13, and on the inner end of the shaft 10 is secured the spur-gear 14, which is considerably smaller in diameter than is the internal gear. Between the ends of the shaft on the spreader 12 is journaled the disk 15, having a peripheral construction designed to be engaged by a portion of the driving mechanism. In the drawings this disk 15 is shown as having peripheral gear-teeth and is larger in diameter than the internal gear. In suitably-disposed bosses on this disk or gear 15 are formed bearings in which are journaled pinion-shafts 16 16, having at one end pinions 17 17, which mesh with the teeth of the gear 14, while to the other ends of these shafts 16 are secured the pinions 18 18, larger in diameter than those marked 17, which mesh with the teeth of the internal gear 13.

When under normal conditions the disk or gear 15 is caused to rotate by the mechanism, as by the motor-gear 19, the pinions 17 and 18, with their shafts, form driving connections between the said gear 15 and the internal gear 13 and the spur 14, thus driving the shafts 8 and 10 and any mechanism with which the same are connected at a constant speed. If now either of these shafts be retarded, as by the cramping of one of the wheels shown in the drawings in turning a corner, the internal gear 13 or the spur-gear 14 is also retarded in its rotation, causing a proportionate acceleration of the rotative speed of the pinions and the gear 13 or 14, as the case may be.

When the shaft is released from its increase of load or retardation, the whole mechanism assumes its normal operation of driving the shafts in unison.

Having thus described my invention, I claim as new and desire to secure by Letters Patent—

The combination with the shafts 8 and 10 each having an axial socket enlarged at its inner end the bearings for the shafts, the internal gear 13 fixed on the shaft 8, and the gear 14 fixed on the shaft 10, of the spreader 12 having its ends seated in the enlarged ends of the shaft-sockets and its pivots journaled in said sockets, the disk or gear 15 rotatable on the spreader, the shaft 16 journaled in the gear 15, and the pinions 17 and 18 fixed on the ends of said shaft 16 and meshing respectively with the gear 13 and the gear 14, as and for the purpose described.

CHARLES H. METZ.

Witnesses:
A. E. DENISON,
HENRY J. MILLER.